United States Patent
Gehm et al.

(10) Patent No.: US 10,993,410 B2
(45) Date of Patent: May 4, 2021

(54) PULSATION SYSTEM

(71) Applicants: Lanny Gehm, Lisle, NY (US); William Gehm, Lisle, NY (US)

(72) Inventors: Lanny Gehm, Lisle, NY (US); William Gehm, Lisle, NY (US)

( * ) Notice: Subject to any disclaimer, the term of this patent is extended or adjusted under 35 U.S.C. 154(b) by 169 days.

(21) Appl. No.: 16/419,987

(22) Filed: May 22, 2019

(65) Prior Publication Data

US 2020/0367464 A1 Nov. 26, 2020

(51) Int. Cl.
| | |
|---|---|
| *A01J 5/04* | (2006.01) |
| *A01J 5/16* | (2006.01) |
| *A01J 5/007* | (2006.01) |
| *A01J 5/017* | (2006.01) |

(52) U.S. Cl.
CPC ............ *A01J 5/047* (2013.01); *A01J 5/007* (2013.01); *A01J 5/0175* (2013.01); *A01J 5/16* (2013.01)

(58) Field of Classification Search
CPC ........................ A01J 5/047; A01J 5/007; A01J 5/0175; A01J 5/16; A01J 5/048; A01J 5/10; A01J 5/14
See application file for complete search history.

(56) References Cited

U.S. PATENT DOCUMENTS

| | | | |
|---|---|---|---|
| 1,355,839 A | 10/1920 | Mehring | |
| 1,858,266 A | 5/1932 | Dinesen | |
| 2,017,754 A | 10/1935 | Hodson | |
| 2,646,058 A * | 7/1953 | Thomas | A01J 5/10 137/103 |
| 4,011,838 A | 3/1977 | Nordegren et al. | |
| 5,553,567 A * | 9/1996 | Wilson | A01J 5/10 119/14.28 |
| 5,598,808 A * | 2/1997 | Wilson | A01J 5/14 119/14.28 |
| 5,697,325 A | 12/1997 | Gehm et al. | |
| 2008/0067461 A1 | 3/2008 | Petersen | |
| 2011/0168098 A1 | 7/2011 | Gehm et al. | |
| 2012/0312237 A1 | 12/2012 | Hansen et al. | |
| 2013/0263788 A1 | 10/2013 | Buck et al. | |
| 2017/0000075 A1 | 1/2017 | Johansson | |
| 2018/0020633 A1 | 1/2018 | Gehm et al. | |

* cited by examiner

*Primary Examiner* — Trinh T Nguyen
(74) *Attorney, Agent, or Firm* — Brown & Michaels, PC

(57) ABSTRACT

A valve device that transitions between the pressure and vacuum phases for the purpose of milking animals. The improvement provides a pulsation output with a vacuum supply duration less than that of atmospheric air pressure supply duration.

3 Claims, 3 Drawing Sheets

$V_{on}$ vacuum supply on, $V_{off}$ vacuum supply off $A_{on}$ air supply on, $A_{off}$ air supply off $L_{open}$ is liner open, $L_{closed}$ is liner closed

PULSATION SYSTEM

FIELD OF THE INVENTION

The present invention pertains to an improvement of a milking system for domesticated animals and, more particularly to a milking system providing a pulsation delivering atmospheric air to the pulsation chamber for a duration of time equal to or greater than the time delivering vacuum to the pulsation chamber.

DESCRIPTION OF RELATED ART

Typical milking systems apply periodic alternating pressure to the pulsation chamber (teat cup) of a milking apparatus. This results in the removal and the flow of milk from the udder to which the teat cup is applied. The alternating pressure between the atmospheric pressure and vacuum cycles is typically controlled by a two-way valve combination that feeds a pulsation chamber. Conventional pulsator designs commonly incorporate a sealing feature at both ends of the valve to provide proper function for minimizing air or vacuum leakage. This valving apparatus is commonly referred to as a pulsator.

The typical milking system integrates the pulsator with a teat cup and claw. The teat cup contains an inflatable liner that, when alternately pressurized and depressurized, causes the udder to release its milk. The milk then flows from the teat cup into the claw, which comprises a hollow chamber that serves as the collection unit for a plurality of teat cups or into a hose and a receiving container in the case of robotic milking systems. Milk gathered by the claw is then transported to a series of hoses and pipes, terminating at a storage tank.

Referring to FIG. 2, a conventional pulsation apparatus 107 is shown. A solenoid valve plunger 102 is received within a housing 100 connected to chamber 101. Solenoid valve plunger 102 has seals 104 and 105 located at each end in order to seal connections to the air inlet 108 or vacuum inlet 106 respectively. Outlet 109 provides the connection to the pulsation chamber.

U.S. Pat. No. 5,697,325 discloses a milking system including a valve design with controlling electronics to solve known milking performance problems with conventional milking systems. The milking system of U.S. Pat. No. 5,697,325 features two independent solenoids for control of vacuum and atmospheric pressure. The solenoid valve plunger in each of the two independent solenoids moves up and down in the center of the solenoid and has a seal at only one end to minimize air or vacuum leakage when in the closed position. The other end of the valve plunger is rigid and ideally has a tapered end for maximum magnetic strength to aid in lifting the valve plunger.

The typical conventional pulsator incorporates solenoid valves with valve plungers that have seals at each end. A seal is required at each end to enable those designs to control air or vacuum at each end instead of only at one end for the milking system in U.S. Pat. No. 5,697,325.

It is not physically possible to reduce the ratio of time a pulsator provides vacuum relative to fresh air to the pulsation chamber with a typical pulsator while maintaining a milk to rest ratio of 50:50 or greater. This is because a typical conventional pulsator has a solenoid that has two positions allowing for either vacuum or fresh air to be supplied to the pulsation chamber, therefore the milk to rest ratio must be the same as the timing of the solenoid power cycle. This prevents the pulsator from closing off the vacuum supply with the solenoid while maintaining the liner in an open position with vacuum maintained within the pulsation chamber.

A common problem in the industry is to have a liner fail such that either milk or washing fluid is pulled into the pulsation chamber and is rapidly sucked up the hoses connecting the pulsation chamber to the pulsator. The result is a volume of liquid being sucked into and through the pulsator and then into the pipes connected to the vacuum pump.

U.S. Publication No. 2018/0020633, entitled "Milking System", which is hereby incorporated by reference, discloses an innovation incorporating above atmospheric pressure air into the pulsator. However, the milking system does not allow the atmospheric air pressure to be applied to the pulsation chamber for a period of time greater than the application of vacuum.

SUMMARY OF THE INVENTION

An improved milking system that features an electronic controller providing a timing duration to pulsator valves such that the vacuum supply connection duration is less than the fresh air supply connection duration to the pulsation chamber. The change in duration significantly reduces the sucking of liquid into the pulsator in the event of a failure in the liner of the milking system. The improved system further permits a greater than atmospheric (positive pressure) pressure supply that further reduces the sucking of liquid into the vacuum system. The system comprises a two-valve pulsator that provides a sharp transition between the alternating air pressure and vacuum that are supplied to a pulsation chamber. One valve of the pulsator mechanism controls the vacuum inlet; the other valve controls the atmospheric air inlet. Each valve device is controlled by an electronic controller providing power. The design of that electronic controller is such that the duration of applying power to the vacuum valve is less than the duration of applying power to the fresh air valve.

In an alternate embodiment, another valve mechanism can be added between a conventional pulsator and the pulsation chamber or the use of a rotary valve with at least two discrete positions to select either vacuum, atmospheric air or neither for connection to the pulsation chamber.

DETAILED DESCRIPTION OF THE INVENTION

Figure 1:
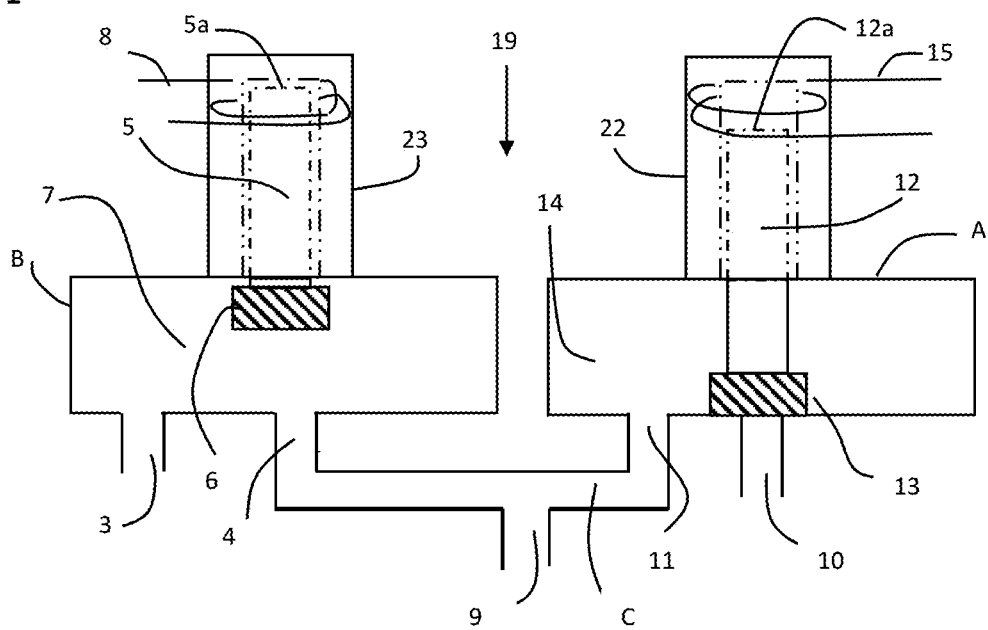
FIG. 1 shows a schematic diagram of the pulsation apparatus of an embodiment of the invention.
Figure 2:
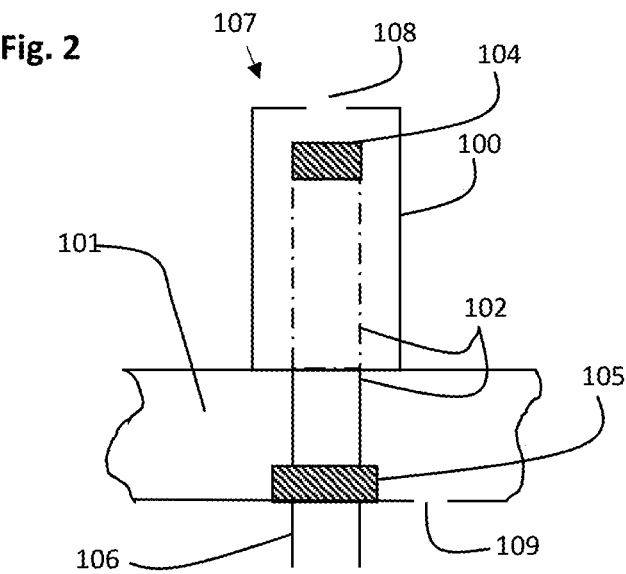
FIG. 2 illustrates a schematic diagram of a conventional pulsation apparatus.

In an embodiment of the present invention, a pulsator is improved by changing the ratio of time that the pulsator supplies vacuum to the pulsation chamber (shell) relative to the time it supplies fresh (atmospheric) air. This approach is novel in that all milking systems require the liner to be open for a duration of time longer than it is closed, therefore conventional milking systems must have the vacuum source connected to the pulsation chamber for a duration longer than the air source is connected. The reason for this is to achieve milking efficiency with more time spent milking the animal as opposed to resting the teat. The pulsator must provide vacuum to the pulsation chamber in order to open the liner to permit the flow of milk. Replacing the vacuum with fresh air causes the liner to close thus eliminating milk flow.

In an embodiment of the present invention, the pulsator closes off either the vacuum or fresh air supply connections within the pulsator independent of the pressure (vacuum or fresh air) in the pulsation chamber. This is accomplished with a pulsator having two valves with one dedicated to controlling vacuum supply and the other dedicated to controlling fresh air. The electronic controller of the present invention provides power to two solenoids, such that the valves can close off either the vacuum or fresh air connections while maintaining the desired milk/rest ratio.

In an embodiment of the present invention, the valve controlling vacuum is opened for a time duration sufficient to permit the pulsation chamber to achieve the desired stable vacuum level sufficient to hold the liner open. The valve is then closed while the pulsator maintains a vacuum within the pulsation chamber. The same action is possible for the valve controlling the atmospheric air supply.

It will be recognized that the benefits of the present invention are to reduce power consumption of the valves or solenoids permitting them to run cooler and to reduce the duration of time the pulsator output is connected to the vacuum supply. The reduced time connected to the vacuum supply limits the duration of time the pulsator can suck liquid up the connecting hoses in the event of a leak in a hose or a liner. The present invention also permits a pulsator design in which the fresh air supply can be a positive (above atmospheric) pressure with the controlling valve remaining open for a duration longer than the vacuum supply is connected. The positive pressure permits any liquid accumulated within the connecting hose to be pushed back towards the source of the leak in the liner.

It should be noted that altering the ratio of time that the pulsator supplies vacuum to the pulsation chamber (shell) relative to the time it supplies fresh (atmospheric) air is impossible with the typical conventional pulsator as the valves must always either connect the pulsation chamber to vacuum or atmospheric (fresh) air. In order to provide reasonable milking action for the animal, the milk to rest ratio must be 50:50 or greater, which prevents reducing the pulsator vacuum phase to a duration less than the pulsator fresh air phase.

The present invention pertains to a milking system having a pulsator unit that has separate pressure and vacuum channels. Each channel is controlled by its own respective valve. The first valve of channel A controls the vacuum inlet, controlling the supply of a vacuum to a teat-cup of a milking apparatus. The second valve of channel B controls the atmospheric air inlet and air pressure to a teat cup of a milking apparatus. The control means actuating the valves creates a sharp transition in the pulsator outlet between the atmospheric air and the vacuum, so that the vacuum and atmospheric air sources are never simultaneously connected.

Referring to FIG. 1, a pulsator 19 includes three channels, A, B and C, with channel A controlling the vacuum inlet 10, and channel B controlling the atmospheric air pressure inlet 3. Channel A has a chamber 14, and channel B has a chamber 7 Chamber 14 has a vacuum pressure outlet 11 and a vacuum pressure inlet 10 Chamber 7 comprises an atmospheric air pressure outlet 4 and an atmospheric air pressure inlet 3.

Received within chamber 14 of channel A and solenoid housing 22 is a solenoid valve plunger 12, forming a first valve. An end of the solenoid valve plunger 12 has a seal 13 and is biased against vacuum pressure inlet 10 in chamber 14. A solenoid coil 15 is powered to move the solenoid valve plunger, in order to open vacuum pressure inlet 10.

Received within chamber 7 of channel B and solenoid housing 23 is a solenoid valve plunger 5, forming a second valve. An end of the solenoid valve plunger 5 has a seal 6 and is biased against atmospheric air pressure outlet 4. A solenoid coil 8 is powered to move the solenoid valve plunger 5, in order to open atmospheric air pressure outlet 4. The atmospheric air pressure outlets 4 and vacuum pressure outlet 11 open to a third channel (channel C), having outlet 9 to the pulsation chamber (not shown).

A control circuit (not shown) via the solenoid coils 15, 8 actuates either the solenoid valve plunger 12 biased against the vacuum pressure inlet 10 in chamber 14 or the solenoid valve plunger 5 biased against the atmospheric air pressure outlet 4 to open.

The ends 5a, 12a of the solenoid valve plungers 5, 12 that are received by the solenoid housing 22, 23 may be flat as shown in FIG. 1 or have a tapered or pointed end to allow for improved magnetic function of the solenoid.

Figure 3:
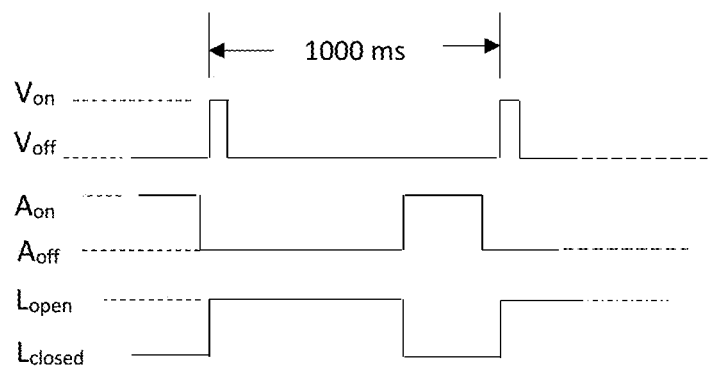
FIG. 3 illustrates a schematic diagram of the vacuum and air supplied from the pulsator apparatus of an embodiment of the present invention.

Referring to FIG. 3, the vacuum and air pressure timing of the improved pulsator apparatus 19 of the present invention is shown. The output $V_{on}$ represents the duration of time vacuum is supplied and $V_{off}$ representing the duration in which the vacuum is not supplied by the pulsator apparatus. $V_{on}$ durations may be in the range of 50 milliseconds to 500 milliseconds. $V_{off}$ durations may be in the range of 200 milliseconds to 800 milliseconds. $A_{on}$ represents the duration of time in which atmospheric air is supplied and $A_{off}$ represents the duration of time in which atmospheric air is not supplied. $A_{on}$ durations may be in the range of 200 milliseconds to 650 milliseconds. $A_{off}$ durations may be in the range of 250 milliseconds to 800 milliseconds. The duration and occurrence of the liner opening and closing $L_{open}$, $L_{closing}$ relative to the supply of vacuum and air is also shown.

Figure 4:
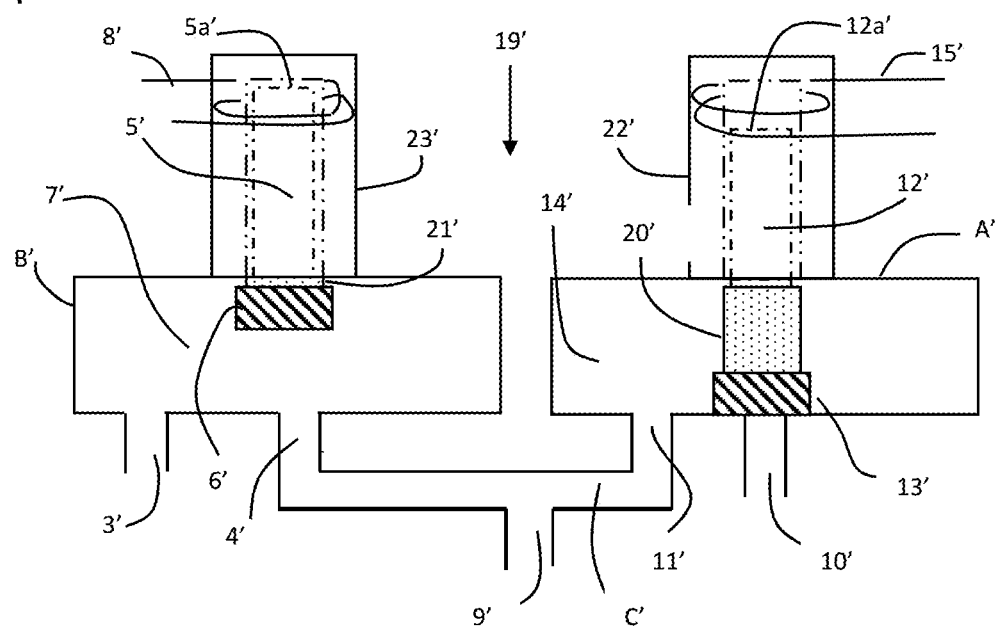
FIG. 4 illustrates a schematic diagram of the pulsation apparatus of an embodiment of the invention having a compressible damper member.

Referring to FIG. 4, a pulsator 19' includes three channels, A', B' and C', with channel A' controlling the vacuum inlet 10', and channel B' controlling the atmospheric air pressure inlet 3'. Channel A' has a chamber 14', and channel B' has a chamber 7'. Chamber 14' has a vacuum pressure outlet 11' and a vacuum pressure inlet 10'. Chamber 7' comprises an atmospheric air pressure outlet 4' and an atmospheric air pressure inlet 3'.

Received within chamber 14' of channel A' and solenoid housing 22' is a solenoid valve plunger 12', forming a first valve. An end of the solenoid valve plunger 12' has a seal 13', an elastomer damper member 20' and is biased against vacuum pressure inlet 10' in chamber 14'. A solenoid coil 15' is powered to move the solenoid valve plunger, in order to open vacuum pressure inlet 10'.

Received within chamber 7' of channel B' and solenoid housing 23' is a solenoid valve plunger 5', forming a second valve. An end of the solenoid valve plunger 5' has a seal 6', an elastomer damper member 21' and is biased against atmospheric air pressure outlet 4'. A solenoid coil 8' is powered to move the solenoid valve plunger 5', in order to open atmospheric air pressure outlet 4'. The atmospheric air pressure outlets 4' and vacuum pressure outlet 11' open to a third channel (channel C'), having outlet 9' to the pulsation chamber (not shown).

A control circuit (not shown) via the solenoid coils 15', 8' actuates either the solenoid valve plunger 12' biased against the vacuum pressure inlet 10' in chamber 14' or the solenoid valve plunger 5' biased against the atmospheric air pressure outlet 4' to open.

The ends 5a', 12a' of the solenoid valve plungers 5', 12' that are received by the solenoid housing 22', 23' may be flat as shown in FIG. 4 or have a tapered or pointed end to allow for improved magnetic function of the solenoid.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A milking apparatus of a pulsator mechanism comprising:
    a pulsator comprising a first valve and a second valve, the first and second valves each comprising a channel and a solenoid housing having a first end open to the channel and a second end; a respective inlet and a respective outlet through which atmospheric air pressure and vacuum can be respectively supplied to a teat-cup milking apparatus, a solenoid valve plunger reciprocally movable in the solenoid housing with a first end in the channel for sealing the inlet from the outlet and a second end in the solenoid housing opposite the first end;
    a first valve control for controlling the supply of atmospheric air pressure to the teat-cup milking apparatus;
    a second valve control for controlling the supply of a vacuum to the teat-cup milking apparatus;
    a common outlet operatively connected to both of the first valve and the second valve through which atmospheric air pressure and vacuum are alternately supplied to the teat-cup milking apparatus from the first and second valves, respectively; and
    control means connected to the solenoid of the first valve and the solenoid of the second valve, the control means respectively actuating and deactivating the first valve and second valve to provide alternating supply of atmospheric air pressure and vacuum to the common outlet, with the first valve and second valve never being simultaneously actuated, such that the first valve or the second valve associated with the vacuum is open for a duration less than the other of the first valve or the second valve associated with the supply of atmospheric air pressure being open.

2. The milking apparatus of claim 1, wherein the pressure of air supplied is greater than atmospheric pressure.

3. An improved milking apparatus for providing pressure and vacuum phases of a pulsator mechanism, comprising: a pulsator comprising a first valve and a second valve, the first and second valves each having a respective inlet and a respective outlet through which air pressure and vacuum can be respectively supplied to a teat-cup milking apparatus, the first valve and second valve each having a channel and a solenoid housing having a first end in the channel and a second end; and a solenoid valve plunger reciprocally moveable in the solenoid housing with a first end in the channel for sealing the inlet from the outlet and a second end in the solenoid housing, opposite the first end; a common outlet operatively connected to both of said valves through which air pressure and vacuum are alternately supplied to said teat-cup milking apparatus from said first and second valves, respectively; and control means connected to the solenoid of the first and the solenoid of the second valve, the control means respectively actuating and deactivating said first and second valve to provide alternating supply of air pressure and vacuum to said common outlet, with said first and second valve controls never being simultaneously actuated, the improvement comprising:
    a highly compressible damper member between an end of the solenoid valve plunger and the solenoid housing of each of the first valve and the second valve, wherein a height of the damper member is approximately equal to a distance the solenoid valve plunger travels for actuation of the first valve or the second, such that the first valve or the second valve supplying vacuum is open for a duration less than the other of the first valve or second valve supplying air pressure.

* * * * *